US012681749B2

(12) United States Patent
Fonseca et al.

(10) Patent No.: US 12,681,749 B2
(45) Date of Patent: Jul. 14, 2026

(54) HARDWARE AGNOSTIC VIRTUALIZED MACHINE LEARNING AND ARTIFICIAL INTELLIGENCE ACCELERATOR

(71) Applicant: VMware LLC, Palo Alto, CA (US)

(72) Inventors: Jose Manuel Rios Fonseca, London (GB); Zack Rusin, Rose Valley, PA (US); Shibdas Bandyopadhyay, Fremont, CA (US)

(73) Assignee: VMware LLC, Palo Alto, CA (US)

( * ) Notice: Subject to any disclaimer, the term of this patent is extended or adjusted under 35 U.S.C. 154(b) by 406 days.

(21) Appl. No.: 18/319,959

(22) Filed: May 18, 2023

(65) Prior Publication Data
US 2024/0385865 A1 Nov. 21, 2024

(51) Int. Cl.
*G06F 9/455* (2018.01)
*G06N 3/08* (2023.01)
*G06N 3/10* (2006.01)

(52) U.S. Cl.
CPC .......... *G06F 9/45558* (2013.01); *G06N 3/08* (2013.01); *G06N 3/10* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 11,301,762 B1 * | 4/2022 | Chen | ...................... | G06N 5/027 |
| 2017/0076194 A1 | 3/2017 | Versace et al. | | |

| | | | | |
|---|---|---|---|---|
| 2017/0124451 A1 * | 5/2017 | Barham | .................... | G06N 3/08 |
| 2018/0203673 A1 * | 7/2018 | Ravishankar | .......... | G06N 5/022 |
| 2021/0337420 A1 * | 10/2021 | Lo | ........................ | H04L 41/0806 |
| 2022/0027792 A1 * | 1/2022 | Cummings | ............ | G06N 3/045 |
| 2022/0036123 A1 * | 2/2022 | Cummings | ............ | G06V 10/82 |
| 2022/0164216 A1 | 5/2022 | Liu et al. | | |
| 2022/0180253 A1 * | 6/2022 | Bordawekar | ......... | G06F 9/4881 |
| 2022/0198296 A1 * | 6/2022 | Liu | ......................... | H04L 67/52 |
| 2022/0385647 A1 * | 12/2022 | Pabón | ..................... | H04L 63/08 |

(Continued)

OTHER PUBLICATIONS

Extended European Search Report, European Application No. 24174634.6 dated Oct. 21, 2024, 9 pages.

(Continued)

*Primary Examiner* — Lewis A Bullock, Jr.
*Assistant Examiner* — Christian M Bakhit
(74) *Attorney, Agent, or Firm* — King Intellectual Asset Management

(57) ABSTRACT

The disclosure provides an approach for a hardware agnostic paravirtualized machine learning (ML) and artificial intelligence (AI) accelerator in a virtual environment. A method includes running a ML application on a first virtual computing instance (VCI) on a host; generating a set of tensors based on one or more computations associated with the ML application; generating a computational graph for the ML application based on the set of tensors; providing, by a paravirtualized ML accelerator running on the host, the computational graph to a driver VCI running on the host; and executing the one or more computations associated with the ML application using at least one of the one or more physical hardware ML accelerators associated with the paravirtualized ML accelerator.

20 Claims, 4 Drawing Sheets

(56) References Cited

U.S. PATENT DOCUMENTS

| | | | | |
|---|---|---|---|---|
| 2023/0105476 | A1* | 4/2023 | Anil | G06F 9/4881 |
| | | | | 718/102 |
| 2023/0120932 | A1* | 4/2023 | Parr | B07B 1/14 |
| 2023/0121044 | A1* | 4/2023 | Grover | G06F 8/30 |
| | | | | 706/25 |
| 2023/0368077 | A1* | 11/2023 | Yao | G06N 20/00 |

OTHER PUBLICATIONS

Anonymous: "Introduction to graphs and tf.function | TensorFlow Core", Mar. 14, 2023, pp. 1-17, XP093212572, Retrieved from the Internet: URL: https://web.archive.org/web/20230314181224/https://www.tensorflow.org/guide/intro_to_graphs [retrieved on Oct. 8, 2024], pp. 1-4.

Anonymous: "Hardware-assisted virtualization—Wikipedia", Mar. 25, 2017, XP055676374, Retrieved from the Internet: URL: https://en.wikipedia.org/w/index.php?title=Hardware-assistedvirtualization&oldid=772152856 [retrieved on Mar. 18, 2020], pp. 1-2.

Riera et al., Halo 1.0: A Hardware-agnostic Accelerator Orchestration Framework for Enabling Hardware-agnostic Programming with True Performance Portability for Heterogeneous HPC, Journal of LatEx Class Files, vol. 14, No. 8, Aug. 2015, 13 pages.

European Examination Report in EP Application No. 24174634.6, dated Jan. 8, 2026, 7 pages.

Anonymous: "Intermediate representation—Wikipedia", Jun. 11, 2014 (Jun. 11, 2014), XP055501927, Retrieved from the Internet: URL: https://en.wikipedia.org/w/index.php?title=Intermediate_representation&oldid=612477744 [retrieved on Aug. 24, 2018].

\* cited by examiner

100

300

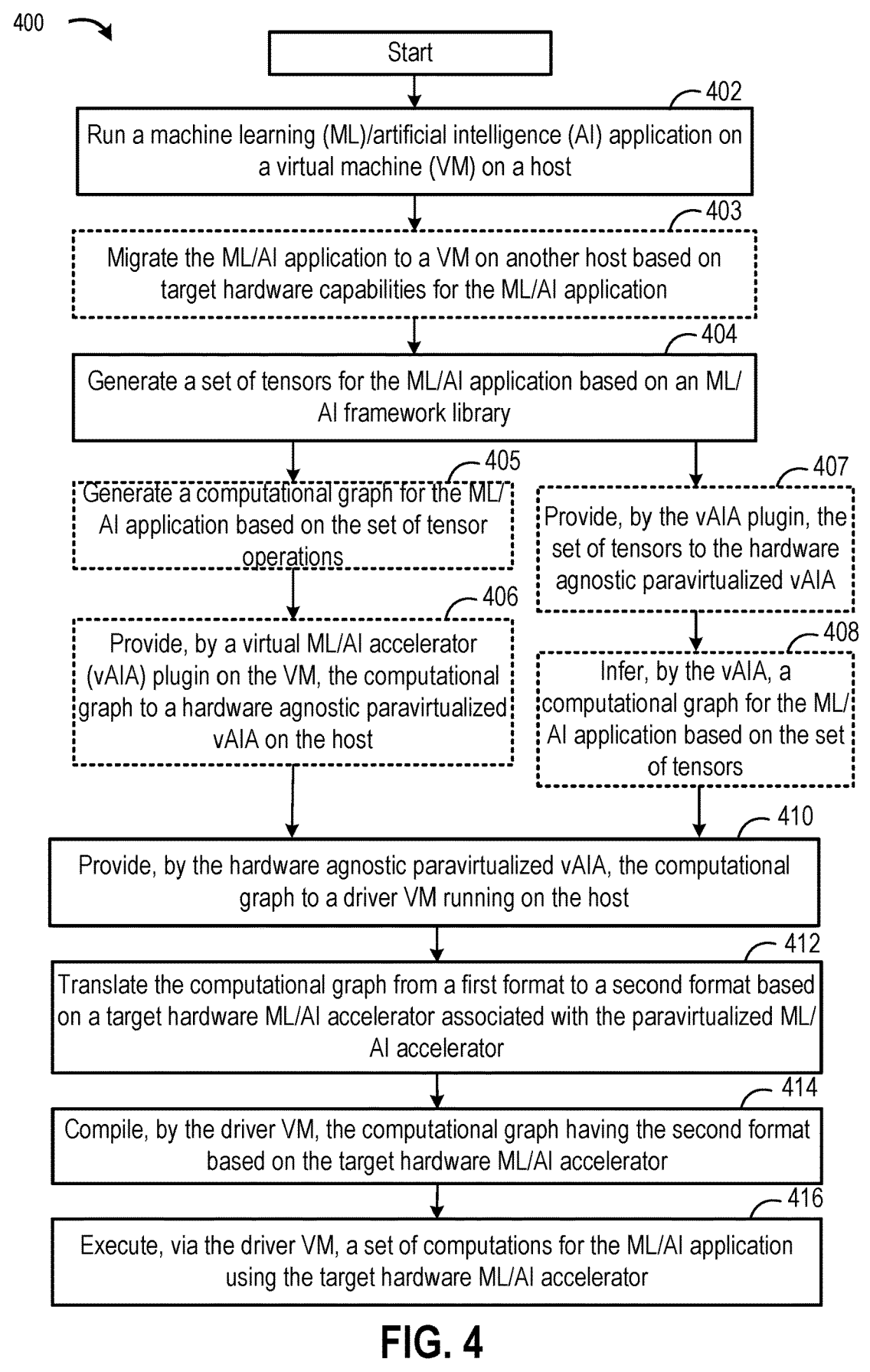

400

```
                    ┌─────────────────────┐
                    │        Start        │
                    └─────────────────────┘
                               │
                               ▼
        ┌────────────────────────────────────────────────────┐  ─402
        │ Run a machine learning (ML)/artificial intelligence │
        │ (AI) application on a virtual machine (VM) on a host │
        └────────────────────────────────────────────────────┘
                               │
                               ▼
        ┌┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┐  ─403
        ┊ Migrate the ML/AI application to a VM on another    ┊
        ┊ host based on target hardware capabilities for the  ┊
        ┊ ML/AI application                                   ┊
        └┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┄┘
                               │
                               ▼
        ┌────────────────────────────────────────────────────┐  ─404
        │ Generate a set of tensors for the ML/AI application │
        │ based on an ML/AI framework library                 │
        └────────────────────────────────────────────────────┘
```

402 Run a machine learning (ML)/artificial intelligence (AI) application on a virtual machine (VM) on a host

403 Migrate the ML/AI application to a VM on another host based on target hardware capabilities for the ML/AI application

404 Generate a set of tensors for the ML/AI application based on an ML/AI framework library

405 Generate a computational graph for the ML/AI application based on the set of tensor operations

406 Provide, by a virtual ML/AI accelerator (vAIA) plugin on the VM, the computational graph to a hardware agnostic paravirtualized vAIA on the host

407 Provide, by the vAIA plugin, the set of tensors to the hardware agnostic paravirtualized vAIA

408 Infer, by the vAIA, a computational graph for the ML/AI application based on the set of tensors

410 Provide, by the hardware agnostic paravirtualized vAIA, the computational graph to a driver VM running on the host

412 Translate the computational graph from a first format to a second format based on a target hardware ML/AI accelerator associated with the paravirtualized ML/AI accelerator

414 Compile, by the driver VM, the computational graph having the second format based on the target hardware ML/AI accelerator

416 Execute, via the driver VM, a set of computations for the ML/AI application using the target hardware ML/AI accelerator

FIG. 4

HARDWARE AGNOSTIC VIRTUALIZED MACHINE LEARNING AND ARTIFICIAL INTELLIGENCE ACCELERATOR

BACKGROUND

Machine learning (ML) is a subfield of artificial intelligence (AI) that involves the development of algorithms and statistical models that enable computers to improve their performance on a specific task by learning from data without being explicitly programmed. Machine learning algorithms can be broadly categorized into three types: supervised learning, unsupervised learning, and reinforcement learning. Supervised learning involves training an algorithm on labeled data, where the desired output is provided alongside the input. The algorithm learns to predict the output for new input data based on the patterns in the training data. Unsupervised learning, on the other hand, involves training an algorithm on unlabeled data, where the algorithm learns to discover hidden patterns and structure in the data. Reinforcement learning is a type of learning where the algorithm learns through trial and error, by receiving feedback in the form of rewards or penalties based on its actions.

Some examples of ML/AI include deep learning, in which the ML/AI is implemented by one or more artificial neural networks with a large number layers, commonly referred to as a deep neural network (DNN) (e.g., a deep Q network (DQN), a deep belief network (DBN), or a deep convolutional network (DCN)). An artificial neural network may be composed of an interconnected group of artificial neurons (e.g., neuron models) that represents a method performed by a computational device. Individual nodes in the artificial neural network may be designed to take input data and perform simple operations on the data, similar to biological neurons. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics). Different types of artificial neural networks include, but are not limited to, recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each has a receptive field (e.g., a spatially localized region of an input space) and that collectively tile an input space. Convolutional neural networks have numerous applications. In particular, CNNs have broadly been used in the area of pattern recognition and classification. In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

Machine learning has numerous applications, including image and speech recognition, natural language processing, recommendation systems, and fraud detection. It is also used in various fields, including healthcare, finance, and manufacturing, to improve decision-making and automate complex tasks. Overall, machine learning is a powerful technology with a wide range of applications and benefits. Advances in ML/AI have led to an increase of task automation and efficiency extraction across industry, including, but not limited to, applications for robotics, Internet of Things (IOT), and other data-intensive or sensor-driven tasks. These advances in ML/AI rely on increasingly large models and datasets. Machine learning, and deep learning in particular, involve numerous calculations involving linear algebra, such as multiplication and vector dot products. The demands of these ML/AI applications outpaces advances in semiconductor ability to handle processing for these ML/AI applications.

An ML/AI accelerator is a class of specialized high performance hardware accelerator for a computer system. An ML/AI accelerator is designed to run ML/AI applications more efficiently, in terms of time, energy, and/or total cost. ML/AI accelerators may reduce the time to train, infer, and execute an ML/AI model. The use cases and types of ML/AI accelerators are diverse. For example, some ML/AI accelerators offer low-precision arithmetic, novel dataflow architectures, matrix multiplication, convolution, and in-memory computing capability.

ML/AI accelerators may be application-specific integrated circuits (ASICs), vision processing units, systolic arrays, tensor cores, graphics processing units (GPUs), multicore scalar processors, spatial accelerators, field-programmable gate array (FPGAs), and the like. A systolic array is a circuit design where multiply-accumulate units are laid out in an array. Inputs are fed on one side of the array. The computation flows through the array one element per cycle. The outputs can be read on the opposite side of the array. The systolic array can carry operations such as matrix multiplications efficiently, as intermediate results are not read/written to random access memory (RAM). Larger arrays can process larger matrices more efficiently, at the cost of latency.

These ML/AI chips may contain billions of transistors and are power hungry. Design goals for ML/AI accelerators include scalability and minimization of power consumption.

The diversity in use and types of ML/AI accelerators may vary over time and across hardware vendors, on-premises and cloud data centers, edge locations, and ML frameworks. Current ML/AI applications integrate hardware specific user space drivers and libraries. The diversity in ML/AI hardware, therefore, creates challenges to customers and infrastructure administrators.

ML/AI applications may run in a virtualized computer environment.

Computer virtualization is a technique that involves encapsulating a physical computing machine platform into virtual machines (VMs) executing under control of virtualization software on a hardware computing platform or "host." A VM provides virtual hardware abstractions for processor, memory, storage, and the like to a guest operating system (OS). The virtualization software, also referred to as a "hypervisor," may include one or more virtual machine monitors (VMMs) to provide execution environment(s) for the VM(s). VMs are an abstraction of physical hardware that can allow one server to function as many servers. The hypervisor allows multiple VMs to run on a single host. Each VM includes a full copy of an OS, one or more applications, and necessary binaries and libraries.

Migration refers to the process of transferring workloads or applications from one physical server or computing environment to another, within or between datacenters. This can involve moving VMs, applications, and data from one server or datacenter to another, either manually or automatically. Migration may achieve a more efficient and optimized use of resources, and allows VMs to fully leverage the benefits of virtualization.

Migration can be classified into two main types: live migration and offline migration. Live migration, also known as hot migration, involves transferring a running VM or application from one physical host to another without interrupting the service or causing any noticeable downtime. Live migration may require a shared storage system, as the entire memory and state of the VM must be transferred from one server to another while the VM continues to run. Live migration is typically used for load balancing, server maintenance, and hardware upgrades. Offline migration, also known as cold migration, involves shutting down a VM or application and transferring it from one physical host to another. Offline migration is usually slower and less flexible than live migration, but may be used for disaster recovery, system backups, and moving non-critical workloads.

Software defined networks (SDNs) involve physical host computers in communication over a physical network infrastructure of a data center (e.g., an on-premise data center or a cloud data center). Each host computer may include one or more virtualized endpoints such as VMs, data compute nodes, isolated user space instances, namespace containers (e.g., Docker containers), or other virtual computing instances (VCIs), that communicate with one another over logical network(s), such as logical overlay network(s), that are decoupled from the underlying physical network infrastructure and use tunneling protocols. Containers are an abstraction at the application layer that packages code and dependencies together. Multiple containers can run on the same host or virtual machine and share the OS kernel with other containers, each running as isolated processes in user space. Applications today are deployed onto a combination of VMs, containers, application services, and more.

Some approaches have been developed for virtualization of hardware supporting ML/AI applications. These approaches, however, are hardware specific, creating challenges to migration of ML/AI workloads and requiring custom plug-ins, specifications, libraries, and the like, for different underlying physical hardware. The current approaches expose hardware specific interfaces to the VMs, limiting the ability for migration of ML/AI workloads to different physical hardware.

Low level hardware acceleration application programming interfaces (APIs) can be virtualized through hypervisor assisted remoting. An API specification may be used to generate the API remoting code, reducing the amount of logic to support new APIs. However, this approach may be impractical to support heterogeneous hardware devices in an ML/AI framework that directly calls vendor specific APIs. In this case, different specifications are written for different vendor specific APIs, making live migration impossible and making cold migration between different vendors, using different hardware devices, challenging.

In some approaches, GPU paravirtualization may use a single instruction multiple thread (SIMT) execution model. GPU paravirtualization may not be suitable for ML/AI accelerators having dedicated circuits for higher-level operations such as matrix multiplication or convolutions. Further, the kernel performance depends on the GPU architecture, which varies across hardware vendors. Thus, different GPU vendors provide different libraries for basic linear algebra and neural network operations with compute kernels tailored for multiple GPUs.

Peripheral component interconnect (PCI) passthrough (PCI-passthrough) is an approach in which a single PCI device can be directly accessed by multiple VMs with the assistance of a vendor provided host plug-in. The plug-in is responsible for partitioning the device resources and emulating certain functionality. PCI-passthrough requires identical hardware at both ends for migration of workloads.

Hardware disaggregation is an approach that involves transparently splitting a Python process into two halves. One half is local to the VM, and the other half is remote. This approach only enables migration of the local half but not migration of the remote half.

Accordingly, what is needed are techniques for decoupling ML/AI applications from the hardware, so ML/AI workloads can easily be deployed on different hardware ML/AI accelerators (e.g., in different datacenters or on different clouds).

SUMMARY

The technology described herein provides for a hardware agnostic virtualized ML/AI accelerator (vAIA).

A method includes running a ML application on a first virtual computing instance (VCI) on a host. The method includes generating a set of tensors based on one or more computations associated with the ML application running on the first VCI. Each tensor comprises an array of numerical data associated with the ML application. The method includes generating a computational graph for the ML application based on the set of tensors. The computational graph comprises a set of nodes associated with the tensors. Each node comprises an operation on a tensor. Edges between the nodes represents a flow of data between the nodes. An edge in to a node comprises a tensor operand and an edge out of the node comprises a tensor result of the operation. The method includes providing, by a paravirtualized ML accelerator running on the host, the computational graph to a driver VCI running on the host. The paravirtualized ML accelerator is associated with one or more physical hardware ML accelerators. The method includes executing the one or more computations associated with the ML application using at least one of the one or more physical hardware ML accelerators associated with the paravirtualized ML accelerator.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIG. 4 depicts a block diagram of a workflow for using a vAIA on a host in a virtual environment, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
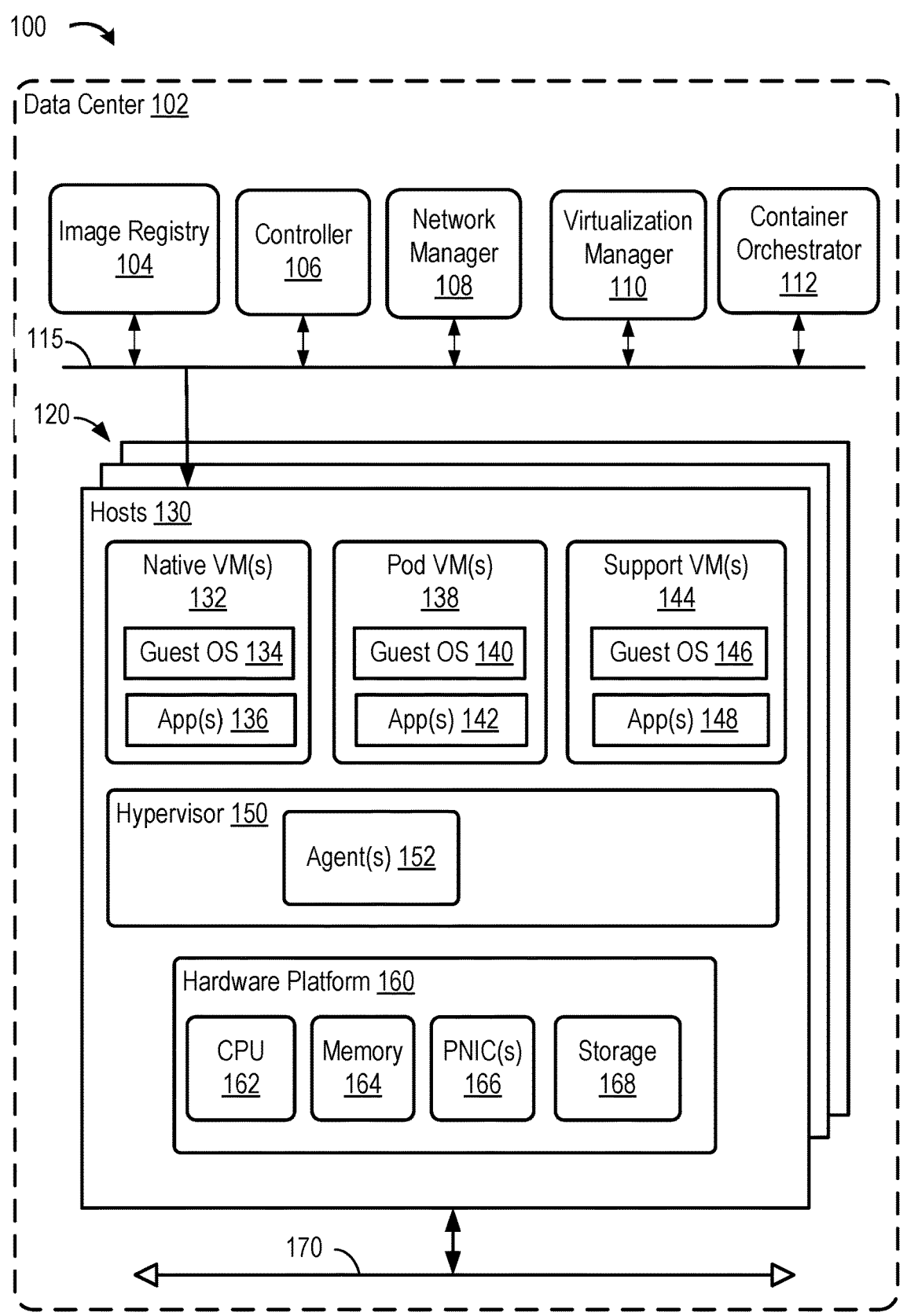
FIG. 1 depicts a block diagram of a data center in a network environment, according to one or more embodiments.

The present disclosure provides an approach for virtualization of ML/AI accelerators.

Virtualization of ML/AI accelerators may increase accelerator utilization by allowing multiple VMs or containers to be consolidated into the same physical ML/AI accelerator. Virtualization of ML/AI accelerators abstracts the underlying physical hardware, facilitating the migration of accelerated ML/AI workloads across different hardware vendors, on-premises, and cloud providers.

The hardware agnostic vAIA may enable migration of ML/AI workloads to different hardware, different vendors, and/or different clouds, while avoiding the problems described above and enabling simplified operational management provided for other workloads. For example, the hardware agnostic vAIA allows migration of ML/AI workloads to different underlying hardware without requiring changes to in-guest drivers or customer applications. The hardware agnostic vAIA enables the use of cloud-specific hardware accelerators in multi-cloud deployments. The hardware agnostic vAIA supports cold migration of ML/AI workloads between vendors; migration of ML/AI workloads between identical hardware; migration of ML/AI workloads between different hardware; hardware consolidation; hardware aggregation; and uncustomized hardware drivers.

Virtual infrastructure management may ensure that accelerators are load balanced (e.g., through migration of ML/AI workloads) and that distributed applications expand to span more nodes as new jobs are created and to contract to span fewer nodes as jobs are destroyed. In addition, the vAIA allows host maintenance without downtime, through migration of the ML/AI workloads to other hosts while upgrading the host software, and without any changes to the VMs.

In some embodiments, the hardware agnostic vAIA is a virtualized ML/AI accelerator. In full virtualization, the OS is fully isolated, unaware of the virtualization, and is based on OS calls.

In some embodiments, the hardware agnostic vAIA is a paravirtualized ML/AI accelerator. Paravirtualization implements partial isolation and the hypervisor communicates with the guest OS through hypercalls in place of OS instructions.

With paravirtualization, the virtual hardware-software interface is different from the physical hardware-software interfaces. Paravirtualization allows for efficient virtualization by avoiding round-trips and unnecessary synchronization between the guest OS and the host.

In some embodiments, the hardware agnostic vAIA abstracts one or more ML/AI accelerators through the use of computational graphs, to perform an ML/AI computation by the one or more underlying physical hardware ML/AI accelerators. Use of computational graphs by the vAIA enables the efficient translation of the ML/AI computation on the virtualization host, hiding all hardware specific implementation details from the VM running the ML/AI application.

In some embodiments, for an ML/AI application running on a VM on a host, an ML/AI library is used by the ML/AI application to generate tensors based on computations associated with the ML/AI application and the tensors are used to generate a computation graph. A vAIA plugin on the VM is used to provide the tensors or computational graph to a vAIA running on the host. The vAIA backend may translate the computational graph into a format consumable by a graph compiler running on a driver VM on the host. The graph compiler may compile the computational graph based on the underlying hardware ML/AI accelerators. The vAIA then executes the computational graph, using the underlying hardware ML/AI accelerators, via hardware drivers running on the driver VM.

In some embodiments, the vAIA may be used for cloud disaster recovery. Cloud Disaster Recovery is a service currently based on virtualization which allows a business to recover from ransomware attacks by keeping a backup on the cloud. A single-click fall back to a good backup in the event of an attack may be provided. Use of the vAIA allows Cloud Disaster Recovery service to extend to accelerated ML/AI workloads, allowing on-premise workloads to fall back to the cloud, where the cloud provider ML/AI accelerators differ from those used on-premise. For example, a business could have an inhouse chatbot based on a ML models on premises, running on a certain GPU. With the vAIA, those virtualized ML workloads can migrate to the cloud in the event of an attack, even if the on-premises and cloud ML accelerators are not the same (e.g., different GPU vendors).

In some embodiments, the vAIA may be used for multi-cloud scenarios to enable accelerator ML/AI workloads to be deployed on different clouds, with different hardware. For example, a business could be running image tagging and face recognizing ML workloads on GPUs on-premises. During times of peak user traffic, when on-premises capacity is exhausted, the business can deploy the ML workload on a third party cloud provider, to keep up with demand. The vAIA allows the workloads to be transparently deployed on different clouds, even if the physical hardware is not the same.

In some embodiments, the vAIA may be used for edge scenarios, where virtualization is deployed at many locations hosting ML accelerators (e.g., retail stores). For example, a retail store chain might be using virtualization to run many applications on an server located each retail store, including ML inference, for purposes such as detecting customer traffic and actions along their stores. With the vAIA, the retail store chain can deploy the same applications, even if the physical hardware varies on each store, because the applications will see a uniform virtual hardware.

In some embodiments, the vAIA may be used to accelerate smarter management of virtual machines in a virtualized environment.

Thus, use of the vAIA described herein simplifies the operation and management of the physical infrastructure, by allowing the workloads to migrate across disparate physical hardware.

FIG. 1 depicts example physical and virtual network components in a networking environment 100 in which embodiments of the present disclosure may be implemented.

Networking environment 100 includes a data center 102. Data center 102 includes an image registry 104, a controller 106, a network manager 108, a virtualization manager 110, a container orchestrator 112, a management network 115, one or more host clusters 120, and a data network 170

A host cluster 120 includes one or more hosts 130. Hosts 130 may be communicatively connected to data network 170 and management network 115. Data network 170 and management network 115 are also referred to as physical or "underlay" networks, and may be separate physical networks or may be the same physical network with separate virtual local area networks (VLANs). As used herein, the term "underlay" may be synonymous with "physical" and refers to physical components of networking environment 100. Underlay networks typically support Layer 3 (L3) routing based network addresses (e.g., Internet Protocol (IP) addresses).

Hosts 130 may be geographically co-located servers on the same rack or on different racks in any arbitrary location in the data center. Host(s) 130 are configured to provide a virtualization layer, also referred to as a hypervisor 150, that abstracts processor, memory, storage, and networking resources of a hardware platform 160 into multiple VMs (e.g., native VMs 132, pod VMs 138, and support VMs 144). Each VM (e.g., native VM(s) 132, pod VM(s) 138, and support VM(s) 144) includes a guest OS (e.g., guest OSs 134, 140, and 146, respectively) and one or more applications (e.g., application(s) 136, 142, and 148, respectively). The guest OS may be a standard OS and the applications may run on top of the guest OS. An application may be any software program, such as a word processing program, a virtual desktop interface (VDI), or other software program. The applications can includes containerized applications executing in pod VMs 138 and non-containerized applications executing directly on guest OSs in in native VMs 132. Support VMs 144 have specific functions within host cluster 120. For example, support VMs 144 can provide control plane functions, edge transport functions, and/or the like. As discussed in more detail below with respect to FIG. 2, a host 130 may run one or more VMs 205 running one or more ML/AI applications and one or more virtual ML/AI accelerators.

Host(s) 130 may be constructed on a server grade hardware platform 160, such as an x86 architecture platform. Hardware platform 160 of a host 130 may include components of a computing device such as one or more central processing units (CPUs) 162, memory 164, one or more physical network interfaces (PNICs) 166, storage 168, and other components (not shown). A CPU 162 is configured to execute instructions, for example, executable instructions that perform one or more operations described herein and that may be stored in memory 164 and storage 168. PNICs 166 enable host 130 to communicate with other devices via a physical network, such as management network 115 and data network 170.

Memory 164 is hardware allowing information, such as executable instructions, configurations, and other data, to be stored and retrieved. Memory 164 may be volatile memory or non-volatile memory. Volatile or non-persistent memory is memory that needs constant power in order to prevent data from being erased, such as dynamic random access memory (DRAM).

Storage 168 represents persistent, non-volatile memory, storage devices that retains its data after having power cycled (turned off and then back on), which may be byte-addressable, such as one or more hard disks, flash memory modules, solid state disks (SSDs), magnetic disks, optical disks, or other storage devices, as well as combinations thereof. In some embodiments, hosts 130 access a shared storage using PNICs 166. In another embodiment, each host 130 contains a host bus adapter (HBA) through which input/output operations (IOs) are sent to the shared storage (e.g., over a fibre channel (FC) network). A shared storage may include one or more storage arrays, such as a storage area network (SAN), a network attached storage (NAS), or the like. In some embodiments, shared storage 168 is aggregated and provisioned as part of a virtual SAN (vSAN). As discussed in more detail below with respect to FIG. 2, a memory 164 may store one or more computational graphs.

Hypervisor 150 architecture may vary. Hypervisor 150 can be installed as system level virtualization software directly on the server hardware (often referred to as "bare metal" installation) and be conceptually interposed between the physical hardware and the guest OSs executing in the VMs. Alternatively, the virtualization software may conceptually run "on top of" a conventional host OS in the server. In some implementations, hypervisor 150 may comprise system level software as well as a "Domain 0" or "Root Partition" VM (not shown) which is a privileged machine that has access to the physical hardware resources of the host 130. In this implementation, one or more of a virtual switch, a virtual router, a virtual tunnel endpoint (VTEP), etc., along with hardware drivers, may reside in the privileged VM. One example of hypervisor 150 that may be used is a VMware ESXi™ hypervisor provided as part of the VMware vSphere® solution made commercially available from VMware, Inc. of Palo Alto, California.

Data center 102 includes a management plane and a control plane. The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 108 at least in part implements the management plane and controller 106 at least in part implements the control plane The control plane determines the logical overlay network topology and maintains information about network entities such as logical switches, logical routers, and endpoints, etc. As used herein, the term "overlay" may be used synonymously with "logical" and refers to the logical network implemented at least partially within networking environment 100. The logical topology information is translated by the control plane into network configuration data, such as forwarding table entries to populate forwarding tables at virtual switches in each host 130. A virtual switch provided by a host 130 may connect virtualized endpoints running on the same host 130 to each other as well as to virtual endpoints on other hosts. Logical networks typically use Layer 2 (L2) routing based on data link layer addresses (e.g., Medium Access Control (MAC) addresses). The network configuration data is communicated to network elements of host(s) 130.

Controller 106 generally represents a control plane that manages configuration of VMs within data center 102. Controller 106 may be one of multiple controllers executing on various hosts 130 in data center 102 that together implement the functions of the control plane in a distributed manner. Controller 1065 may be a computer program that resides and executes in a server in data center 102, external to data center 102 (e.g., in a public cloud), or, alternatively, controller 106 may run as a virtual appliance (e.g., a VM) in one of the hosts 130. Although shown as a single unit, it should be understood that controller 106 may be implemented as a distributed or clustered system. That is, controller 106 may include multiple servers or VCIs that implement controller functions. It is also possible for controller 106 and network manager 108 to be combined into a single controller/manager. Controller 106 collects and distributes information about the network from and to endpoints in the network. Controller 106 is associated with one or more virtual and/or physical CPUs (not shown). Processor(s) resources allotted or assigned to controller 106 may be unique to controller 106, or may be shared with other components of data center 102. Controller 106 communicates with hosts 130 via management network 115, such as through control plane protocols. In some embodiments, controller 106 implements a central control plane (CCP).

Network manager 108 and virtualization manager 110 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, virtualization manager 110 is a computer program that executes in a server in data center 102 (e.g., the same or a different server than the server on which network manager 108 executes), or alternatively, virtualization manager 110 runs in one of the VMs. Virtualization manager 110 is configured to carry out administrative tasks for data center 102, including managing hosts 130, managing VMs running within each host 130, provisioning VMs, transferring VMs from one host 130 to another host, transferring VMs between data centers, transferring application instances between VMs or between hosts 130, and load balancing among hosts 130 within data center 102. Virtualization manager 110 takes commands as to creation, migration, and deletion decisions of VMs and application instances on data center 102. Virtualization manager 110 also makes independent decisions on management of local VMs and application instances, such as placement of VMs and application instances between hosts 130. In some embodiments, virtualization manager 110 also includes a migration component that performs migration of VMs between hosts 130. One example of a virtualization manager 110 is the vCenter Server™ product made available from VMware, Inc. of Palo Alto, California. One example of control plane functions is vMotion® made commercially available from VMware, Inc. of Palo Alto, California.

In some embodiments, network manager 108 is a computer program that executes in a server in networking environment 100, or alternatively, network manager 108 may run in a VM (e.g., in one of hosts 130). Network manager 108 communicates with host(s) 130 via management network 115. Network manager 108 may receive network configuration input from a user or an administrator and generates desired state data that specifies how a logical network should be implemented in the physical infrastructure of data center 102. Network manager 108 is configured to receive inputs from an administrator or other entity (e.g., via a web interface or application programming interface (API)), and carry out administrative tasks for data center 102, including centralized network management and providing an aggregated system view for a user. One example of a network manager 108 is the NSX™ product made available from VMware, Inc. of Palo Alto, California.

Container orchestrator 112 provides a platform for automating deployment, scaling, and operations of application containers across host cluster(s) 120. In some embodiments, the virtualization layer of a host cluster 120 is integrated with an orchestration control plane. For example, virtualization manager 110 may deploy the container orchestrator 112. The orchestration control plane can include the container orchestrator 112 and agents 152, which may be installed by virtualization manager 110 and/or network manager 108 in hypervisor 150 to add host 130 as a managed entity. Although container orchestrator 112 is shown as a separate logical entity, container orchestrator 112 may be implemented as one or more native VM(s) 132 and/or pod VMs 138. Further, although only one container orchestrator 112 is shown, data center 102 can include more than one container orchestrator 112 in a logical cluster for redundancy and load balancing. In some systems, containers are grouped into logical units called "pods" that execute on nodes in a cluster (also referred to as "node cluster"). A node can be a physical server or a pod VM 138.

Figure 2:
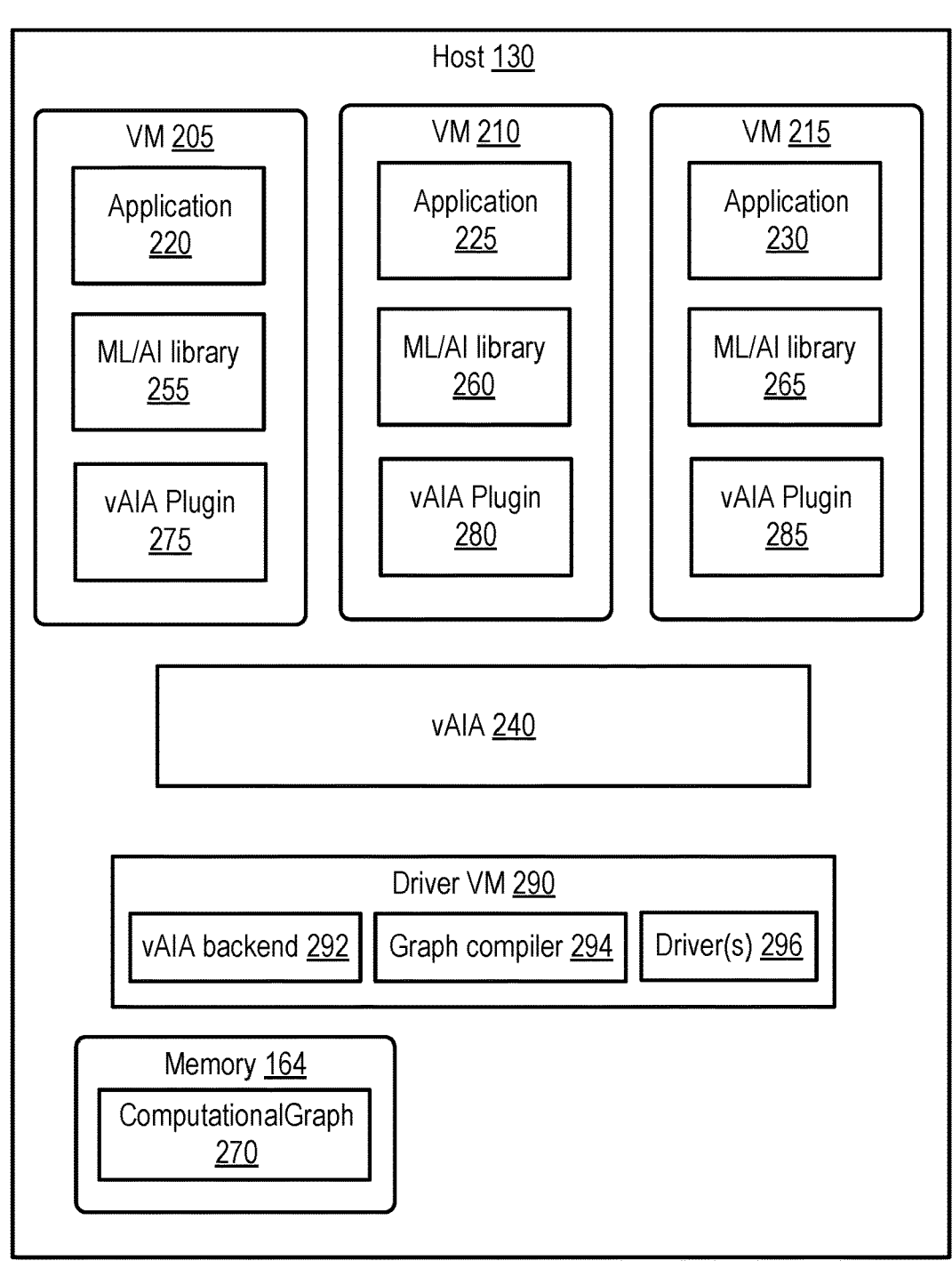
FIG. 2 is a block diagram of an example hardware agnostic virtualized ML/AI accelerator running on a host, according to one or more embodiments.

In some embodiments, the network environment 100 includes one or more hardware agnostic vAIAs. FIG. 2 is a block diagram of an example hardware agnostic vAIA running on a host 130, according to one or more embodiments. As shown, one or more VMs running on host 130, such as VM 205, VM 210, and VM 215, run an ML/AI application (application 220 on VM 205, application 225 on VM 210, and application 230 on VM 215).

In some embodiments, when the end user deploys the ML/AI application, the under user will declare the infrastructure needs of the application, such as target RAM, CPU, disk, and ML features the application requires. The ML/AI application will then be deployed on a host that has ML/AI accelerator hardware to meet the target requirements (typically there will be many hosts, possibly with different HW.) The ML application (the VM) can then migrate to other hosts (for load balancing or system maintenance purposes), provided the new host it migrates to can also meet all the requirements.

Different hardware may support a different, sometimes overlapping, subset of tensor operations and data-types. In some embodiments, capabilities levels are defined to allow ML/AI workloads to migrate between heterogeneous hardware ML/AI accelerators. For example, a first capability level may be defined for 8-bits integer arithmetic CNNs, another capability level may defined for full tensor operation with arbitrary data types. The different hardware ML/AI accelerators may support different capability levels. In some embodiments, the user selects a capability level (e.g., a minimum capability level to support the ML/AI workload) for a given ML/AI workload. Accordingly, the migration of the ML/AI workload may be based on the specified capability level.

The ML/AI applications are associated with an ML/AI framework using an ML/AI library. As shown, VM 205 uses ML/AI library 255, VM 210 uses ML/AI library 260, and VM 215 uses ML/AI library 265. The VMs may use the same ML/AI framework or different ML/AI frameworks. In some embodiments, multiple ML/AI frameworks are supported, and the ML/AI framework to be used is selected by a user.

One example of an ML framework is TensorFlow. TensorFlow is an open-source library for numerical computation using data flow graphs. TensorFlow provides a simple and powerful interface for creating complex models. TensorFlow supports a variety of deep learning architectures, including CNNs, RNNs, and more. The computation is organized as a computational graph, where each node in the graph represents an operation, and the edges represent the data that flows between the nodes. The data that flows between the nodes is represented as multidimensional arrays called tensors. Tensors are the fundamental building blocks of TensorFlow, and they can represent a variety of data types, including scalars, vectors, matrices, and higher-dimensional arrays. A tensor is an object that represents multi-dimensional arrays of numerical data. Tensors can be scalars (0-dimensional), vectors (1-dimensional), matrices (2-dimensional), or higher-dimensional arrays. In machine learning, tensors may be used to represent data, such as images, sound waves, or text, that are processed by neural networks. For example, a color image can be represented as a 3-dimensional tensor, where the first dimension represents the height of the image, the second dimension represents the width of the image, and the third dimension represents the color channels (red, green, and blue). TensorFlow also provides a high-level API that makes it easy to create and train complex machine learning models. For example, the TensorFlow API can be used to define a CNN for image classification by simply defining the layers of the network and specifying the loss function and optimization algorithm.

Another example of an ML framework is PyTorch. PyTorch is an open-source ML library that is primarily used for building deep learning models for a variety of applications such as image recognition, natural language processing, and computer vision. PyTorch uses a dynamic computational graph, which allows a model to be built on-the-fly as it runs, as opposed to a static graph used by other frameworks like TensorFlow. PyTorch uses tensor computation, which allows for efficient numerical computations. This makes PyTorch ideal for large-scale data processing, as it can handle vast amounts of data quickly and efficiently. PyTorch also offers a number of pre-built functions that make it easier for developers to work with complex data structures such as matrices and vectors.

Another example of an ML framework is ONNX-RT (Open Neural Network Exchange Runtime). ONNX-RT is an open-source software framework designed to accelerate the performance of deep learning models by optimizing their execution on various hardware platforms such as CPUs, GPUs, and FPGAs. ONNX-RT supports the ONNX (Open Neural Network Exchange) format, which is an open-source format for representing deep learning models that allows developers to easily move their models between different deep learning frameworks, such as TensorFlow and PyTorch.

The ML/AI frameworks may define several thousand tensor operations, from trivial element-wise arithmetic to complex FFTs. In some embodiments, the user may define custom tensor operations, such as through C++ or CUDA routines.

Host 130 runs one or more vAIAs 240. In some embodiments, each ML/AI application may be associated with its own vAIA. In some embodiments, a vAIA may be associated with multiple ML/AI applications. As shown in FIG. 2, vAIA 240 is shared by application 220 on VM 205, application 225 on VM 210, and application 230 on VM 215. In some embodiments, the vAIA 240 performs computations to assist (e.g., speed up) the ML/AI application 220, 225, 230. In some embodiments, the vAIA is a process running on the host 130 or on a VM running on the host 130 that is responsible or handling I/Os.

VAIA 240 is a software emulation of a physical hardware ML/AI accelerator(s) 250. VAIA 240 enables an OS (e.g., the guest OSs running on the VMs) to interact with the physical hardware ML/AI accelerator(s) 250 as if it were physically present on the system. vAIA 240 represents one or more ML/AI computation(s) in a hardware agnostic form using a computational graph 270. The ML/AI computation(s) may be done by one or more of the hardware ML/AI accelerators 250 underlying the vAIA 240.

In some embodiments, each vAIA 240 abstracts the aggregation of multiple locally attached physical hardware ML/AI accelerators. In some embodiments, each vAIA 240 abstracts away the interconnect topology and low level hardware specific communication interfaces, ensuring that lateral communication across ML/AI accelerators is direct—without guest VM involvement. In some embodiments, the existence of multiple hardware accelerators is hidden from the VM and the vAIA 240 behaves as a single accelerator, with the combined capacity and throughput of the multiple attached physical accelerators.

In some embodiments, vAIA 240 transfers data between guest memory and the host 130. A memory-mapped input/output (MMIO) mechanism may allow a driver to read from and write to registers, which control its functionality. These registers are mapped to a specific area of system memory, and the device driver can interact with them just as it would with physical hardware. A first-in, first-out (FIFO) buffer may be used to transfer data between the device and the driver. Data is written to the buffer by the driver and read from the buffer by the device, or vice versa. The size of the buffer determines how much data can be transferred at a time, and the device driver must manage the buffer to ensure that data is not lost or corrupted. Interrupt request lines (IRQs) are signals sent to the OS to indicate that it needs attention. When the device driver receives an IRQ, it responds appropriately, such as by reading or writing data, resetting the device, or performing another action.

Unlike other virtual PCIs, in vAIA 240 the state consists of tensors (N-dimensional arrays) and computational graph(s) 270 and graph execution commands operate on the state. In some embodiments, an ML/AI model for an ML/AI application (e.g., application 220, 225, or 230) is parsed, using an ML/AI framework (e.g., ML/AI library 255, 260, or 265), to generate the one or more computational graph(s) 270.

The computational graph(s) 270 are a graphical representation of a mathematical function or algorithm. Computational graph(s) 270 visualize the flow of data through a network of nodes and connections. For example, a computation graph 270 may be a directed acyclic graph whose nodes describe operations between tensors. A tensor operation can be any function between tensors. The nodes represent mathematical operations or functions, and the connections represent the flow of data between them. In some embodiments, the network of nodes are made up of two main types of nodes: input nodes and computation nodes. Input nodes are used to represent the input data that is fed into the graph, while computation nodes represent the mathematical operations that are performed on the data. The connections between the nodes represent the flow of data between them. Each connection has a weight associated with it, which determines how much influence the output of one node has on the input of the next node. The weights may be represented as arrows pointing from one node to another node. In some embodiments, the computation nodes are further divided into different types, depending on the type of mathematical operation they perform. For example, there may be nodes that perform addition, multiplication, or activation functions such as the sigmoid function or the rectified linear unit (ReLU) function.

In some embodiments, the computational graph(s) 270 are used to perform forward and backward propagation, which are the two main phases of a neural network. Forward propagation involves feeding the input data through the graph and computing the output of the final node. Backward propagation involves computing the gradients of the loss function with respect to the weights of the connections, which is used to update the weights during the training process.

Figure 3:
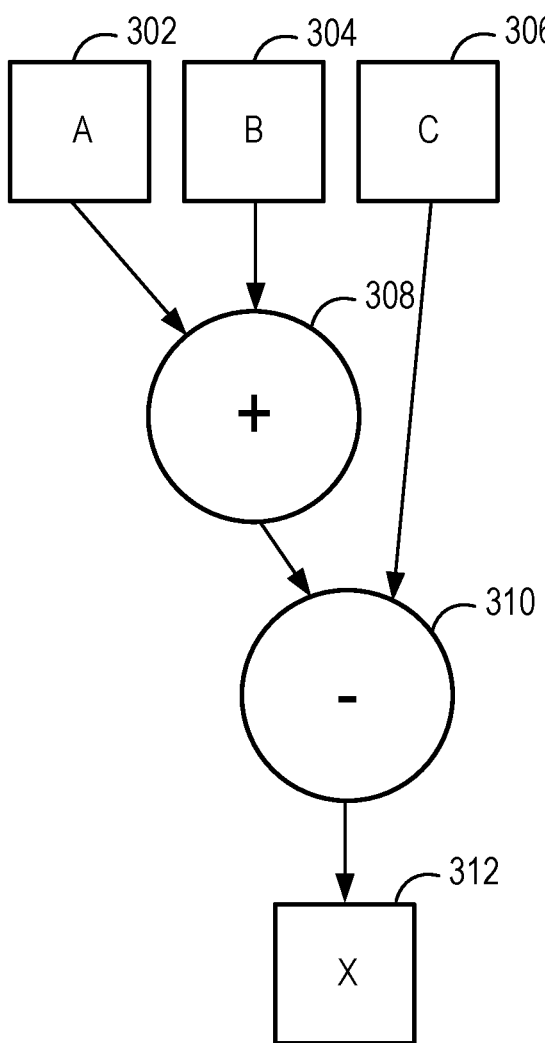
FIG. 3 is a diagram of an example computational graph, according to one or more embodiments.

FIG. 3 depicts an example computational graph 300 (e.g., an example of a computational graph 270). The example computational graph 300 describes the computation of X=A+B−C, where A, B, and C are the input tensors 302, 304, and 306, respectively. Computational node 308 is the addition operation, computational node 310 is the subtraction operation, and X is the output tensor 312. The example computational graph 300 is two layers deep, however, graphs for state-of-the-art NNs can be, for example, hundreds of layers deep.

In some embodiments, the computation graph(s) 270 are stored in memory 164 (and/or in storage 158 as) shown in FIG. 2.

In some embodiments, the ML/AI computations for the ML/AI applications 220, 225, or 230 are lowered to an intermediate form expected by the vAIA, for example, by the creation, uploading, downloading, and destruction of tensors and the creation, execution, and destruction of computational graph(s) 270.

In some embodiments, each VM includes an ML/AI framework specific plugin. As shown in FIG. 2, VM 205 includes vAIA plugin 275, VM 210 includes vAIA plugin 280, and VM 215 includes vAIA plugin 285. In some embodiments, the ML/AI plugin runs on the guest OS of the respective VM.

The ML framework, including the ML/AI library 255, 260, or 265, generates tensors based on the computation associated with the respective ML/AI application 220, 225, or 230. In some embodiments, the ML framework generates computation graph(s) 270 based on the tensors and the vAIA plugin 275, 280, or 285 are used to provide the computation graph(s) 270 to the vAIA 240. In some embodiments, the vAIA plugin 275, 280, or 285 provides the tensors to the vAIA 240 and the vAIA 240 infers computational graph(s) 270 implicitly from the tensors.

In some embodiments, host 130 includes a driver VM 290. In some embodiments, the driver VM 290 is a pod VM 138. The driver VM 290 may run a guest OS 140 (e.g., a Linux kernel) and a container engine running on the guest OS that supports one or more containers running on the pod VM 138. As shown in FIG. 2, the driver VM 290 includes vAIA backend 292, graph compiler 294, and one or more driver(s) 296. The graph compiler 294 and driver(s) 296 may be provided by a vendor of the underlying hardware ML/AI accelerators 250.

In some embodiments, vAIA backend 292 is associated with one or more locally attached physical hardware ML/AI accelerator(s) 250, as shown in FIG. 2. In some embodiments, the one or more physical hardware ML/AI accelerators 250 are attached via a PCI bus. In some embodiments, the one or more vAIA backend 292 is associated with a remote hardware ML/AI accelerator. In some aspects, a remote hardware ML/AI accelerator can be used by running a hardware abstraction layer (e.g., such as by leveraging BitFusion or Radium) inside the driver VM 290. For example, in some embodiments, the tensors or computation graph(s) 270 are sent across a network and executed by a remote ML/AI accelerator.

In some embodiments, the vAIA 240 transfers guest OS commands and data to the driver VM 290 through a para-virtualized memory sharing device. In some embodiments, vAIA 240 transfers the computation graph(s) 270 to the driver VM 290 via the vAIA backend 292. The VAIA backend 292 may translate the computational graph(s) 270 into a form that can be consumed by the graph compiler 294.

In some embodiments, graph compiler 294 takes a trained ML/AI model and compiles the model into a format that can run on different ML/AI accelerator hardware. In some embodiments, graph compiler 294 analyzes computation graph(s) 270 and performs a series of optimizations to optimize the computational graph(s) 270 for target physical hardware ML/AI accelerator(s) 250. The target hardware may be pre-configured.

One example of a graph compiler 294 is an ONNX-RT graph compiler. The ONNX-RT Graph Compiler takes a trained ML/AI model as input and transforms it into a format that can be executed on different hardware devices. The ONNX-RT graph compiler analyzes the computational graph and performs a series of optimizations to make the graph more efficient for the target hardware. The optimizations can include node fusion, where multiple nodes are combined into a single node to reduce memory usage and computation time. The graph compiler can also perform kernel selection, where the optimal mathematical operations are selected for each node based on the target hardware. Once the graph has been optimized, the ONNX-RT graph compiler generates a platform-specific runtime graph. This platform-specific runtime graph is optimized for the target hardware and includes all the necessary mathematical operations and memory allocations. The runtime graph is then executed on the hardware ML/AI accelerators 250.

Another example of a graph compiler 294 is a TVM (Tensor Virtual Machine) graph compiler. The TVM graph compiler breaks down a ML model into a series of computations that can be represented as a directed acyclic graph (DAG). Each node in the DAG represents a computation, and the edges between nodes represent the data flow between computations. The TVM graph compiler then applies a series of optimizations to this graph, including graph-level optimizations like operator fusion, as well as device-level optimizations like memory layout and data movement.

Another example of a graph compiler 294 is a MLIR (Multi-Level Intermediate Representation) graph compiler. The MLIR graph compiler is part of the TensorFlow ML framework. The MLIR graph compiler is designed to be a multi-level IR, which means that it supports multiple levels of abstraction for expressing ML models. MLIR supports high-level abstractions like TensorFlow's computation graph and, at the lower level, MLIR supports low-level abstractions like LLVM IR, which is a low-level representation of a program that can be executed efficiently on a variety of hardware architectures. The MLIR graph compiler takes a TensorFlow computation graph and compiles it down to a lower-level representation that can be executed on accelerators. The MLIR graph compiler uses a series of optimization passes to optimize the computation graph for efficiency and then generates code for the target accelerator.

In some embodiments, the driver VM 290 has direct access to the physical hardware ML/AI accelerator(s) 250. In some embodiments, the driver VM 290 runs unmodified hardware vendor user-space and kernel-space drivers 296, such as Linux drivers, to avoid the need of porting any drivers. Driver VM 290 controls the hardware ML/AI accelerator(s) 250 using the unmodified hardware drivers 296.

From the VM perspective, the vAIA 240 works like a physical hardware device generally does, but without mimicking any particular physical device. Not having to mimic any existing hardware means the vAIA can be optimized for the virtual environment. Because the VAIA 240 does not behave like any hardware previously known to the guest OS, virtual device drivers may be used in the VM.

In some embodiments, for migration of the ML/AI workload, the vAIA 240 quiesces between commands (e.g., between computational graph 270 execution or between a tensor upload/download command.) In some embodiments, mid-graph execution is performed while quiescing.

In some embodiments, vAIA 240 masks features of the underlying physical hardware ML/AI accelerator(s) 250 in order to facilitate the migration between different hardware. As an illustrative example, an ML/AI accelerator A supports tensors with 32-bits and 16-bits floating point representation, and an ML/AL accelerator B supports 16-bits and 8-bits tensors. vAIA 240 may mask out features to a common denominator (16-bits in this case) to allow the computation to transparently move across the ML/AI accelerators A and B. In addition to tensor numeric types, hardware also may diverge in supported tensor operations and maximum tensor size, which vAIA 240 can mask out down to the common denominator.

FIG. 4 depicts a block diagram of a workflow 400 for use of a vAIA on a host, according to one or more embodiments. The workflow 400 may be understood with reference to the example host 130 illustrated in FIG. 2.

As shown, workflow 400 includes, at step 402, running an ML/AI application (e.g., application 220) on a VCI (e.g., VM 205) on a host (e.g., host 130). In some embodiments, the ML/AI application is a query/response application, an image recognition application, a speech recognition application, a natural language processing application, a recommendation generation application, a fraud detection application, or any other type of application using ML/AI.

At step 404, workflow 400 includes generating a set of tensors based on an ML/AI framework library (e.g., ML/AI library 255). In some embodiments, the ML/AI framework is PyTorch, TensorFlow, ONNX-RT, or any other ML/AI framework.

In some embodiments, at step 405, workflow 400 includes generating a computational graph (e.g., computation graph 270) for the ML/AI application based on the set of tensors and, at step 406, providing, by a vAIA plugin (e.g., vAIA plugin 275) on the VCI, the computation graph to a hardware agnostic paravirtualized vAIA (e.g., vAIA 240) running on the host. Alternatively, at step 407, workflow 400 includes providing, by the vAIA plugin, the set of tensors to the hardware agnostic paravirtualized vAIA and, at step 408, inferring, by the vAIA, the computation graph based on the set of tensors. In some embodiments, ML/AI accelerator (e.g., VAIA 235) is a process running on a second VCI on the host.

At step 410, workflow 400 includes providing, by the hardware agnostic paravirtualized vAIA, the computation graph to a driver VM (e.g., driver VM 290) running on the host. In some embodiments, the driver VM runs on a third VCI on the host. In some embodiments, the driver VM is a container or a pod VM (e.g., 138) running on the host. In some embodiments (not shown), the hardware agnostic paravirtualized vAIA masks features of the underlying physical hardware ML/AI accelerator to a common denominator.

At step 412, workflow 400 includes translating the computational graph from a first format to a second format based on a target hardware ML/AI accelerator (e.g., hardware ML/AI accelerator(s) 250). In some embodiments, the translating, at step 412, is performed by the vAIA backend 292 of driver VM 290.

At step 414, workflow 400 includes compiling, by the driver VM, the computation graph having the second format based on the target hardware ML/AI accelerator. In some embodiments, the compiling, at step 414, is performed by the graph compiler 294 of driver VM 290. In some embodiments, the graph compiler is an ONNX-RT graph compiler, a TVM graph compiler, a MLIR graph compiler, or another graph compiler.

At step 416, workflow 400 includes executing, via the driver VM, a set of computations for the ML/AI application using the target hardware ML/AI accelerator. In some embodiments, the executing, at step 426, is via the one or more hardware drivers 296 of the driver VM 290.

The embodiments described herein provide a technical solution to a technical problem associated with deploying and operating ML/AI workloads in a virtual environment. More specifically, use of a hardware-agnostic paravirtualized vAIA enables efficient hardware utilization and simplified infrastructure operations, while avoiding hardware vendor and cloud provider lock-ins. The hardware-agnostic paravirtualized vAIA enables disparate hardware to be transparently supported, with little virtualization overhead.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method comprising:
running a machine learning (ML) application on a first virtual computing instance (VCI) on a host;
generating a set of tensors based on one or more computations associated with the ML application running on the first VCI, wherein each tensor of the set of tensors comprises an array of numerical data associated with the ML application;
generating a computational graph for the ML application based on the set of tensors, wherein the computational graph comprises a set of nodes associated with the set of tensors, wherein each node comprises an operation on a tensor, wherein edges between the nodes represents a flow of data between the nodes, and wherein an edge in to a node comprises a tensor operand and an edge out of the node comprises a tensor result of the operation;
providing, by a paravirtualized ML accelerator running on the host, the computational graph to a driver VCI running on the host, wherein the paravirtualized ML accelerator is associated with one or more physical hardware ML accelerators; and
executing the one or more computations associated with the ML application using at least one of the one or more physical hardware ML accelerators associated with the paravirtualized MI accelerator.

2. The method of claim 1, further comprising:
providing the set of tensors to the paravirtualized ML accelerator via a plugin running on the first VCI, wherein:
the plugin is associated with the paravirtualized ML accelerator; and
the generating the computational graph for the ML application comprises inferring, by the paravirtualized ML accelerator, the computational graph from the set of tensors and operations.

3. The method of claim 1, wherein:
the generating the computational graph for the ML application is at the first VCI;
the method further comprises providing the computational graph to the paravirtualized ML accelerator via a plugin running on the first VCI; and the plugin is associated with the paravirtualized ML accelerator.

4. The method of claim 1, wherein the paravirtualized ML accelerator is shared by a plurality of VMs on the host.

5. The method of claim 1, wherein the driver VCI comprises a container or a pod virtual machine (VM) running on the host.

6. The method of claim 1, further comprising translating, via a backend of the paravirtualized ML accelerator, the computational graph from a first format to a second format based on a target physical hardware ML accelerator of the one or more physical hardware ML accelerators associated with the paravirtualized ML accelerator.

7. The method of claim 6, further comprising compiling, by a graph compiler of the driver VCI, the computational graph having the second format based on the target hardware ML accelerator.

8. The method of claim 7, wherein executing the one or more computations associated with the MI application using the at least one of the one hardware ML accelerator comprises executing the one or more computations via one or more hardware drivers, running on the driver VCI, associated with the target physical hardware ML accelerator.

9. The method of claim 1, wherein the paravirtualized ML accelerator is hardware agnostic to the one or more physical hardware ML accelerators.

10. The method of claim 1, further comprising migrating the ML application to the host, from another host, based on a determination that the one or more physical hardware ML accelerators support one or more target physical hardware ML accelerator capabilities associated with the MI application.

11. A system comprising:

one or more processors; and at least one memory, the one or more processors and the at least one memory configured to:

run a machine learning (ML) application on a first virtual computing instance (VCI) on a host;

generate a set of tensors based on one or more computations associated with the ML application running on the first VCI, wherein each tensor of the set of tensors comprises an array of numerical data associated with the ML application;

generate a computational graph for the ML application based on the set of tensors, wherein the computational graph comprises a set of nodes associated with the set of tensors, wherein each node comprises an operation on a tensor, wherein edges between the nodes represents a flow of data between the nodes, and wherein an edge in to a node comprises a tensor operand and an edge out of the node comprises a tensor result of the operation;

provide, by a paravirtualized ML accelerator running on the host, the computational graph to a driver VCI running on the host, wherein the paravirtualized ML accelerator is associated with one or more physical hardware ML accelerators; and execute the one or more computations associated with the ML application using at least one of the one or more physical hardware ML accelerators associated with the paravirtualized ML accelerator.

12. The system of claim 11, the one or more processors and the at least one memory further configured to:

provide the set of tensors to the paravirtualized ML accelerator via a plugin running on the first VCI, wherein:

the plugin is associated with the paravirtualized ML accelerator; and the one or more processors and the at least one memory being configured to generate the computational graph for the ML application comprises the one or more processors and the at least one memory being configured to infer, by the paravirtualized ML accelerator, the computational graph from the set of tensors and operations.

13. The system of claim 11, wherein:

the one or more processors and the at least one memory are configured to generate the computational graph for the ML application at the first VCI;

the one or more processors and the at least one memory are further configured to provide the computational graph to the paravirtualized ML accelerator via a plugin running on the first VCI; and the plugin is associated with the paravirtualized ML accelerator.

14. The system of claim 11, wherein the paravirtualized ML accelerator is shared by a plurality of VMs on the host.

15. The system of claim 11, wherein the driver VCI comprises a container or a pod virtual machine (VM) running on the host.

16. The system of claim 11, wherein the one or more processors and the at least one memory are further configured to translate, via a backend of the paravirtualized ML accelerator, the computational graph from a first format to a second format based on a target physical hardware ML accelerator of the one or more physical hardware ML accelerators associated with the paravirtualized ML accelerator.

17. The system of claim 16, wherein the one or more processors and the at least one memory are further configured to compile, by a graph compiler of the driver VCI, the computational graph having the second format based on the target hardware ML accelerator.

18. The system of claim 17, wherein the one or more processors and the at least one memory being configured to execute the one or more computations associated with the ML application using the at least one of the one hardware ML accelerator comprises the one or more processors and the at least one memory being configured to execute the one or more computations via one or more hardware drivers, running on the driver VCI, associated with the target physical hardware ML accelerator.

19. The system of claim 11, wherein the paravirtualized ML accelerator is hardware agnostic to the one or more physical hardware ML accelerators.

20. A non-transitory computer-readable medium comprising instructions that, when executed by one or more processors of a computing system, cause the computing system to perform operations, the operations comprising:

running a machine learning (ML) application on a first virtual computing instance (VCI) on a host;

generating a set of tensors based on one or more computations associated with the ML application running on the first VCI, wherein each tensor of the set of tensors comprises an array of numerical data associated with the ML application;

generating a computational graph for the ML application based on the set of tensors, wherein the computational graph comprises a set of nodes associated with the set of tensors, wherein each node comprises an operation on a tensor, wherein edges between the nodes represents a flow of data between the nodes, and wherein an edge in to a node comprises a tensor operand and an edge out of the node comprises a tensor result of the operation;

providing, by a paravirtualized ML accelerator running on the host, the computational graph to a driver VCI 5 running on the host, wherein the paravirtualized ML accelerator is associated with one or more physical hardware ML accelerators; and executing the one or more computations associated with the ML application using at least one of the one or more 10 physical hardware ML accelerators associated with the paravirtualized ML accelerator.

\* \* \* \* \*